United States Patent Office 3,368,968
Patented Feb. 13, 1968

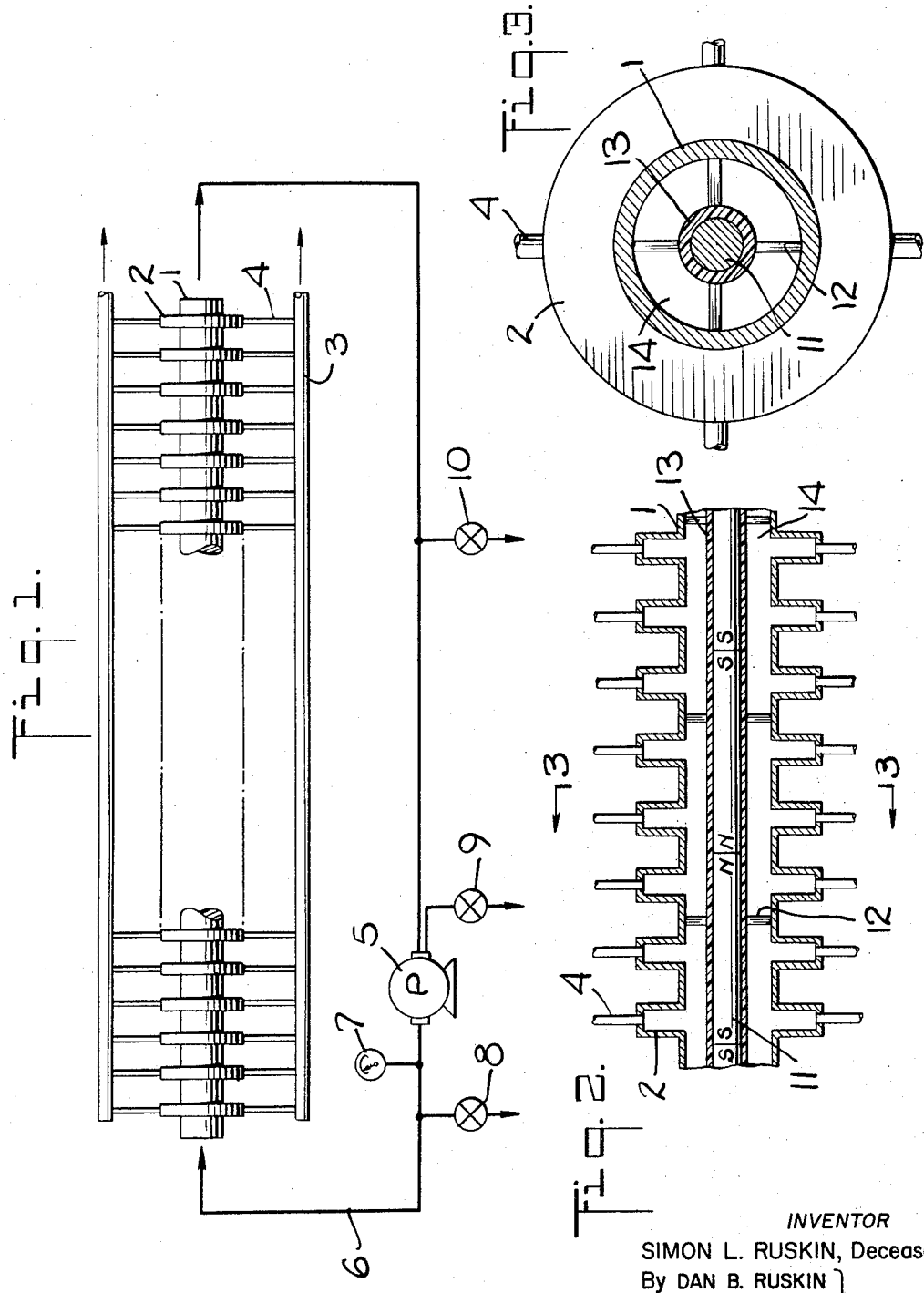

3,368,968
METHOD FOR THE DESALINIZATION OF WATER
Simon L. Ruskin, deceased, late of New York, N.Y., by Dan B. Ruskin, Miami Beach, Fla., and Milton Reder and Carol Farhi, New York, N.Y., executors, assignors to American Machine & Foundry Company, a corporation of New Jersey
Original application Nov. 20, 1957, Ser. No. 697,519, now Patent No. 3,197,402, dated July 27, 1965. Divided and this application Mar. 3, 1965, Ser. No. 439,516
3 Claims. (Cl. 210—42)

ABSTRACT OF THE DISCLOSURE

A method for effecting the desalinization of water and the like containing dissolved salt comprising the steps of passing the liquid through an elongated path in a strong magnetic field to cause the impurities to be propelled outward from the main stream to the periphery of said path substantially to decrease the concentration of said salt in said main stream and collecting the purified liquid from the main stream.

---

This application is a divisional application of my application Ser. No. 697,519, filed Nov. 20, 1957, now U.S. Patent No. 3,197,402, issued July 27, 1965.

My invention relates to methods for the recovery of heavy water, primarily from sea water. It is known that sea water possesses a small but definite amount of heavy water also known as deuterium oxide, $D_2O$. Heavy water is a valuable article of commerce employed primarily in the operation of atomic reactors. Hitherto, recovery of heavy water has been costly and very difficult and attempts to form salts of $D_2O$ and concentration of the salts with ultimate separation of the $D_2O$ have been employed. This procedure, however, is not readily applicable to sea water already rich in various salts, or even to river or lake waters which are known as hard waters, due to their calcium or magnesium salts.

I have found that the separation of heavy water can readily be accomplished simultaneously with the separation of the dissolved salts whereby the heavy water can be concentrated to a commercially useful degree and simultaneously the salts present in sea water are concentrated to a commercially useful amount. These concentrated salts may then be treated by processes commonly known to chemists for the separation of bromine, magnesium, calcium, sodium, gold and other minerals, and sulphates, chlorides and other salt radicals. The process of separation may be electrolytic, chemical, physical and combinations thereof as is well known in the art.

To accomplish my invention, I induce magneto hydrodynamic waves which separate the salts by altering the direction of the particles to the vector product of the magnetic field and the velocity. The sea water or other fluid conducting system is allowed to flow under high velocity through a tube having as its core a permanent magnet, preferably an Alnico magnet of the order of 10,000 Gauss or more, where the length of the magnet bears to the diameter of the magnet a ratio of preferably 3 to 1. Such magnets are arranged in continuous series so that a series of poles are arranged as follows:

NSSNNS . . .

As the stream of water under pressure of 100 p.s.i. is forced through the pipe containing the permanent magnet core, the lines of force of the magnet are successively cut, turbulence occurs and the particles become diamagnetically charged and move at right angles toward the outer wall of the pipe. The magneto hydrodynamic effect produced, in addition to effecting a deposition of the salt particles along the walls of the pipe, also creates magneto hydrodynamic whirl rings whereby a circular motion is imparted to the outer layers of the concentrated salt solution. By introducing a progressive series of outlet tubes, emerging as branches from the main pipe, this concentrated salt solution is successively drained off and the concentrated solution is accumulated in tanks by ordinary engineering procedures. Simultaneously, the main stream becomes progressively free from salts so that ultimately fresh water is obtained in the main current flow. While this procedure provides a valuable method for the separation of salts and the production of fresh water, it is also highly desirable in many technical industrial uses such as the treatment of chemical effluent wastes, boiler water, laundry procedure, oil well flooding procedure for secondary oil recovery where a high degree of fresh water free from salts is desired. In cooling equipment for atomic reactors this method of separating salts from water permits the use of large quantities of sea water as well as pure water.

FIGURE 1 shows a coaxial pipe assembly 1 having a series of annular draw-off zones 2 and draw-off headers 3 with pipes 4 interconnecting the zones 2 and headers 3. A pump 5 circulates the liquid through the pipe assembly 1, and is gauged for pressure at 7 and valved at 8, 9 and 10. The valves admit fresh liquid and expel utilized liquid when desired.

FIGURE 2 is a detail section of the pipe assembly 1, showing additionally the internal series magnets 11.

FIGURE 3 is an end section showing the manner in which the magnets are centrally supported by webs 12 and cylinder 13. The liquid treatment passage is indicated at 14.

This valuable application of magneto hydrodynamic waves arises when an electrically conducting medium is present in a magnetic field. Any hydrodynamic motion will give rise to induced electric fields which produce electric currents. Because of the magnetic fields, these currents will produce forces which change the state of motion, thus producing a type of wave motion called magneto hydrodynamic waves. A body moving in a magnetic field becomes electrically polarized in a direction at right angles to the magnetic field and to the direction of motion. The electric field thus produced is proportional to the vector product of the magnetic field and the velocity.

$$E = (\mu/c)[vH_0]$$

where $H_0$ represents the strength of a homogeneous magnetic field.

An electric current, I, in a magnetic field is acted upon by a force, F, which is at right angles to the current and to the magnetic field:

$$F = \mu c^{-1}[IH_0]$$

The induced current system tends to transfer the central movement to the surrounding layers.

In effect, it may be said that I am producing a mechanical equivalent of a maser and imparting to the salt particles considerably amplified force.

Yet another aspect of my invention is that by my procedure suspended particles present in my conducting fluid are thrown with such force against the containing walls that they are shattered and broken into smallest particles more effectively than a colloid mill and my procedure can be used for milling purposes. By the same procedure I may improve such processes as powder metallurgy, powder welding, electroplating, chemical plating, paint dispersions, pigment suspensions, cold ultrasonic welding, high quality electrical cores, preparation of metallic components for the addition to glass for hardening, electrodes, metal catalysts, finely subdivided metallic fuels, high speed filtration and the like.

Yet another object of my invention is the separation of heavy water present in small quantities in sea water. I accomplish this by taking advantage of the magneto hydrodynamic waves induced in a conducting fluid of different density. Here the conditions prevailing for gases are closer to the conditions necessary for the separation of heavy water.

I may also use my system of magneto hydrodynamic waves in the gas state for the separation of deuterium from hydrogen in the refinement of hydrogen, or I may promote deuterium exchange between hydrogen sulfide and water whereby deuterium sulfide concentrates in the magneto hydrodynamic whirl and is readily drained off in concentrated form. I may also promote the concentration of heavy water directly in the first stages of concentration by inducing magneto hydrodynamic waves whereby the lighter hydrogen water enters the magneto hydrodynamic whirl at the circumference of the pipe, while the central main stream carried the higher concentration of heavy water. Since ions such as Mn, Fe, Co, Ni and Cu, as well as the rare earths are paramagnetic and may reverse the reaction, it is desirable to check the outflow to determine whether the magneto hydrodynamic whirl has carried off the heavy water, or whether the main trunk flow is the enriched heavy water. By recycling three to five times under high pressure, increased concentration is attained. By these procedures a 1000 fold increase of concentration of heavy water is obtained and current procedures such as dual temperature exchange is avoided. To obtain high water pressure, natural pressure heads may be used such as the tide elevation at the Bay of Fundy or water falls. Recycling may be conducted by supplementary pressure pumps. Recycling procedures may follow conventional means for that purpose.

Yet another object of my invention is the enhancement of chemical reactivity by altering crystal symmetry of solids. Symmetrical crystals are generally at base energy levels and in the most stable state, whereas antisymmetrical states are in general heavier and more reactive. Thus catalytic solids may be made more catalytic and chemical reactions that ordinarily need active catalysts may proceed with little or no catalyst. Thus organometal compounds form more readily when the metallic oxide or sulfide has been separated by magneto hydrodynamic waves. Thus in the preparation of tetraethyl lead, I may use such inactive lead compounds such as lead sulfide, lead oxide or lead dioxide, suspended in water and separated by magneto hydrodyanmic waves. These compounds now react readily with ethyl chloride to form tetraethyl lead with the avoidance of the forming of a sodium-lead alloy. Thus also the reaction of lithium ethyl or sodium ethyl with lead sulfide at room temperature produces a rapid reaction with high yields.

Similarly I may use magneto hydrodynamic waves in the rapid separation of mined ores. The ore is ground to flotation size and suspended in water. It is then subjected to magneto hydrodynamic waves and collected through the magneto hydrodynamic whirl at the circumference of the pipe. The ore particles are shattered to fragments of 2 microns which are readily leached and concentrated. Thus in the extraction of uranium from ores, one may use low grade $U_3O_8$ 0.183% ore and leach directly with sulfuric acid from the whirl outlets along the circumference of the pipe.

Yet another object of my invention is the concentration of free (organic) radicals in solution. Thus I may use a diamagnetic solution for the conversion of parahydrogen. Thus triphenylmethyl will readily convert parahydrogen which may be collected from the magneto hydrodynamic whirl. I may for this purpose also employ tetraphenyldiphenoquinodimethane and stilbenoquinodi-methane both of which are diamagnetic. Similarly, rubrene and dibenzanthracine may be employed.

Still another aspect of my invention is the promotion of hydroforming of petroleum and free radical formation in petroleum gases leading to the formation of gasoline. Thus petroleum gases or liquid subjected to magneto hydrodynamic waves react to form long chain hydrocarbons, isomerize, form alkyl and alkane compounds.

While I conduct my magneto hydrodynamic procedure at 20° C. to 25° C., I may also go to low temperatures and even to −273° C. in gases. Active charcoal is best treated at low temperature. Thus is became readily possible to separate ortho from para hydrogen without resorting to the low temperature of −271° C. Since parahydrogen is diamagnetic and ortho hydrogen is paramagnetic, the parahydrogen is repelled at right angles when passing through the tube containing the Alnico magnet while the ortho hydrogen passes parallel to the permanent magnet to be collected at the outlet. Likewise, the same occurs with deuterium and separation is attained.

In the case of deuterium, we also have para and ortho forms with a para-ortho ratio of 2:1 with the ortho form diamagnetic so that the ortho form of deuterium oxide may be repelled from the Alnico magnet along with the para form of light water. Equilibrium of light hydrogen may readily be catalyzed by hydrogenation catalysts such as platinum nickel and iron. Active charcoal will do so at low temperatures. Paramagnetic substances like atomic hydrogen, free organic radicals, nitric oxide, nitrogen dioxide, all of which are paramagnetic on account of their unpaired electrons, also oxygen, which is paramagnetic, and paramagnetic ions in solution such as Mn, Fe, Co, Ni and copper, promote equilibrium.

Where a diamagnetic outer tube is desired, I may use a zinc pipe.

*Example I*

Inside the center of a 20 foot stainless steel pipe, is placed a continuous series of Alnico magnets each 6½ inches in diameter and 20 inches long. At each ½ foot distance is a circumferential drain leading into a common tank. The flow of sea water through the main pipe trunk returns for recirculation and valves are arranged so as to allow drainage of the main trunk at every third circulation. The sea water enters the pipe at 100 p.s.i. and is kept circulating at maximum speed under 100 p.s.i. The contents of the main flow is now gassed with $H_2S$ to allow deuterium exchange while running through a hot tower at 100° C. Thus sulfide and accompanying water are run through a heat exchanger and a cold tower at 25° C. reversing the equilibrium and causing the water to be enriched by the high deuterium sulfide. Additional cycles allow the enriched water to be raised to a $D_2O$ concentration that is distilled.

The salts accumulated from the magneto hydrodynamic whirl are concentrated by evaporation or electrolytically separated as desired.

*Example II*

A ton of uranium ore containing 0.183% $U_3O_8$ is ground to flotation size and added to 6 tons of water. The slurry is pumped through the pipe as described in Example I under 100 p.s.i. and recycled three times. The solids collected from the magneto hydrodynamic whirl are led into a tank of sulfuric acid and leached. Processing of the uranium proceeds from the leaching in customary manner.

*Example III*

100 lbs. of lead sulfide is suspended in a ton of water. The slurry is pumped through the pipe described in Example I, under 200 p.s.i. and recycled five times. The solids are collected from the magneto hydrodynamic whirl and dried in vacuo. The lead sulfide reacts in 15 to 20 minutes with lithium ethyl to form lead tetraethyl. The yields are approximately 85% to 90%.

Yet another aspect of my invention is the addition to the heavy water obtained, small amounts of rhenium powder or colloidal rhenium to prevent the loss of heavy water when in use in the atomic reactor. At super stream temperatures some ionization of the heavy water occurs leading to the formation of $H_2O_2$ and H and O. The rhenium catalyzes the breakdown of the $H_2O_2$ and reconverts to water the hydrogen and oxygen.

*Example IV*

To 500 gallons of heavy water used in an atomic reactor is added 200 grams of rhenium powder. The whole is allowed to circulate continuously for the modification of the reactor energy.

*Example V*

Apparatus was set up employing a horizontal 6.25 foot length of ¾" iron pipe, a water circulating system joined thereto including a centrifugal pump and a source of salt water. A continuous series of ¼" diameter Alnico magnets were arranged in opposed relation as described above along the axis of the pipe and a glass take-off tube located at the end of the pipe for collection of samples of the water effluent. An aqueous salt solution having 3.23% by weight of urea and NaCl was formulated with the following composition (weight percent):

| | Percent |
|---|---|
| Urea | 1.94 |
| Nacl | 1.29 |
| $H_2O$ | Balance |

The salt solution was pumped at a rate of about 1.2 gallons/minute. Approximately 2 grams of the center effluent was collected and when analyzed was found to have a total salt concentration of 0.6%, a reduction in salt concentration of 81.4% in a single pass through the pipe. Samples of the center and outer peripheral portions of the emerging solution were taste tested. The outer ring was "definitely salty" while the center portion was "not salty."

What is claimed is:

1. The method of effecting the desalinization of water containing dissolved salt comprising the steps of passing said water through an elongated path in a strong magnetic field substantially perpendicular to the fluid flow so as to cause said salt particles to become diamagnetically charged and to be propelled outward from the main stream to the periphery of said path to substantially decrease the concentration of said salt in said main stream, and collecting the purified liquid from the main stream.

2. The method of effecting the desalinization of urine containing dissolved salt comprising the steps of passing said urine at a relatively high velocity through an elongated path in a strong magnetic field of at least about 10,000 Gauss substantially perpendicular to the fluid flow so as to cause said salt particles to become diamagnetically charged and to be propelled outward from the main stream to the periphery of said path to substantially decrease the concentration of said salt in said main stream, and collecting the purified liquid from the main stream.

3. The method of effecting the desalinization of urine containing dissolved salt comprising the steps of passing said urine at a rate equivalent to about 1.2 gallons per minute through an elongated path defined by a ¾" diameter iron pipe having an axially disposed ¼" diameter Alnico magnetic core disposed therein to provide a strong magnetic field of at least about 10,000 Gauss substantially perpendicular to the fluid flow so as to cause said salt particles to become diamagnetically charged and to be propelled outward from the main stream to the periphery of said path to substantially decrease the concentration of said salt in said main stream, and collecting the purified liquid from the main stream.

References Cited

UNITED STATES PATENTS 531,183   12/1894   Harris _____ 210—42

OTHER REFERENCES

Ellis, C. B.: Fresh Water From the Ocean, 1954, Ronald Press Co., New York, N.Y., pp. 61–67 relied on.

MORRIS O. WOLK, *Primary Examiner.*

M. E. ROGERS, *Assistant Examiner.*

UNITED STATES PATENT OFFICE
CERTIFICATE OF CORRECTION

Patent No. 3,368,968                      February 13, 1968

Simon L. Ruskin, deceased, by Dan B. Ruskin, Milton Reder and Carol Farhi, executors It is hereby certified that error appears in the above numbered patent requiring correction and that the said Letters Patent should read as corrected below.

In the heading to the printed specification, lines 4 to 8, "Simon L. Ruskin, deceased, late of New York, N. Y., by Dan B. Ruskin, Miami Beach, Fla., and Milton Reder and Carol Farhi, New York, N. Y., executors, assignors to American Machine & Foundry Company, a corporation of New Jersey" should read -- Simon L. Ruskin, deceased, late of New York, N. Y., by Dan B. Ruskin, 1 Lincoln Rd., Miami Beach, Fla. 33139, Milton Reder, 969 Park Ave., New York, N. Y. 10037, and Carol Farhi, 32 East 67th St., New York, N. Y. 10021, executors --.

Signed and sealed this 16th day of September 1969.

(SEAL)
Attest:

EDWARD M. FLETCHER, JR.
Attesting Officer

WILLIAM E. SCHUYLER, JR.
Commissioner of Patents